United States Patent [19]

Herrick et al.

[11] Patent Number: 5,198,182

[45] Date of Patent: Mar. 30, 1993

[54] PRODUCTION OF NEUTRON-SHIELDING TUBES

[75] Inventors: William Herrick, Livonia; Randell Elliott, Novi, both of Mich.

[73] Assignee: AAR Corp., Elk Grove Village, Ill.

[21] Appl. No.: 870,555

[22] Filed: Apr. 17, 1992

[51] Int. Cl.$^5$ ............................................. G21C 21/18
[52] U.S. Cl. ................................... 376/260; 376/288; 976/DIG. 291; 250/518.1
[58] Field of Search ............... 376/260, 288, 287, 327, 376/339, 272, 463; 252/478; 250/518.1; 976/DIG. 291, DIG. 328, DIG. 329, DIG. 334; 428/556, 555

[56] References Cited

U.S. PATENT DOCUMENTS

| 4,006,362 | 2/1977 | Mollon et al. | 376/272 |
| 4,027,377 | 6/1977 | Roszler | 376/288 |
| 4,143,276 | 3/1979 | Mollon | 376/272 |
| 4,751,021 | 6/1988 | Mollon et al. | 376/288 |
| 4,788,030 | 11/1988 | Bosshard | 376/272 |

*Primary Examiner*—Daniel D. Wasil
*Attorney, Agent, or Firm*—Lee, Mann, Smith, McWilliams, Sweeney & Ohlson

[57] ABSTRACT

A method of forming a neutron-absorbing tube or a section of such tube, and the resulting tube. An elongate, generally rectangular metal ingot having a hollow interior is formed with at least one elongate metal divider in the interior forming chambers. The chambers are filled with a uniformly dispersed mixture of finely divided boron and particles of a finely divided metal, the ingot is then soaked to an elevated temperature and hot rolled to form a thin, rigid neutron-absorbing sheet having opposite metal edge portions and an elongated metal spacer portion at each metal divider. The sheet is then longitudinally bent at each spacer portion. A tube is formed by welding one or more bent sheet along the side edge portions.

20 Claims, 1 Drawing Sheet

PRODUCTION OF NEUTRON-SHIELDING TUBES

BACKGROUND OF THE INVENTION

This invention relates to neutron-absorbing or neutron-shielding material, and in particular to a novel process of forming such material into a tube, and the resulting tube.

In U.S. Pat. No. 4,027,377, which is assigned to the assignee of the present application and the disclosure of which is incorporated herein by reference, disclosed is the production of neutron-absorbing or shielding material comprised of a thin, rigid sheet having a neutron-absorbing material, preferably boron carbide, surrounded by aluminum plate. In forming the sheet, an ingot is first formed with a hollow interior, and a mixture of neutron-absorbing material, such as boron carbide powder, and a finely divided metal powder, such as atomized aluminum, is installed in the hollow interior of the ingot. Thereafter, the ingot is sealed, heated to a temperature below the melting point of the metal powder, and is then hot rolled to reduce its thickness a desired amount. The hot rolling causes the particles of metal powder and boron carbide to become metallurgically bonded together so that in subsequent use the material retains its neutron-absorbing properties.

A problem with the material of U.S. Pat. No. 4,027,377 is its inability to be bent and retain its neutron-absorbing capacity at the area of the bend. Consequently, the process of U.S. Pat. No. 4,751,021 was developed to provide a sheet that can be bent. However, the bend cannot be abrupt, and therefore a relatively gentle bend is the result, with the neutron-absorbing boron carbide core being offset to one side of the sheet. That patent requires precision in manufacture, and although a quite satisfactory neutron-absorbing sheet is produced, the process is expensive.

SUMMARY OF THE INVENTION

The present invention relates to a method of making sections of a neutron-absorbing tube, or a tube itself, through a series of steps. First, an elongate, generally rectangular metal ingot is formed having a hollow interior. At least one elongate metal divider is installed in the hollow interior to form at least two chambers in the interior of the ingot. The chambers are then filled with a substantially uniformly dispersed mixture of a finely divided neutron-absorbing boron compound and a finely divided metal powder.

Thereafter, the ingot is soaked to bring it to an elevated temperature below the melting temperature of the metal powder. With the temperature of the ingot thus-elevated, the ingot is hot rolled to reduce its thickness to form a thin, rigid neutron-absorbing sheet having opposite metal edge portions and an elongated metal spacer portion at the location of each metal divider. Finally, the sheet is longitudinally bent at each spacer portion.

In accordance with the preferred form of the invention, only one metal divider is installed in the ingot, and the bending step includes longitudinally bending the sheet to an L-shaped cross section. A tube is formed by making a second, substantially identical section and joining the two sections at their metal edge portions to form the tube. Preferably, one of the metal edge portions of each of the sheets is also bent to an L-shaped cross section before the sheets are joined and welded along their side edges to form a tube.

In accordance with the preferred form of the invention, when the sheet is formed and before bending of the sheet, one of the metal edge portions of the sheet is formed with a greater width than the other edge portion. That greater-width edge portion is the edge portion which is then bent to an L-shaped cross section.

In accordance with a second form of the invention, a neutron-absorbing tube is formed by forming an elongate, generally rectangular metal ingot having a hollow interior, and a series of elongate metal dividers are installed in the interior of the ingot to form at least four chambers in the interior. Those chambers are then filled with the uniformly dispersed mixture of the finely divided neutron-absorbing boron compound and metal powder, the ingot is soaked to bring it to an elevated temperature, and the ingot is then hot rolled to reduce its thickness to form a thin, rigid neutron-absorbing sheet having opposite metal edge portions and an elongated metal spacer portion at the location of each of the metal dividers. The sheet is then longitudinally bent at each of the spacer portions, and the metal edge portions are joined to form a tube. In this form of the invention, also, it is preferred that the formation of the metal edge portions of the sheet is such that one of the metal edge portions has a greater width than the other edge portion so that the one metal edge portion can be bent to an L-shaped cross section before the two edge portions are joined.

BRIEF DESCRIPTION OF THE DRAWINGS

The invention is described in greater detail in the following description of examples embodying the best mode of the invention, taken in conjunction with the drawing figures, in which.

DESCRIPTION OF EXAMPLES EMBODYING THE BEST MOST OF THE INVENTION

Figure 1:
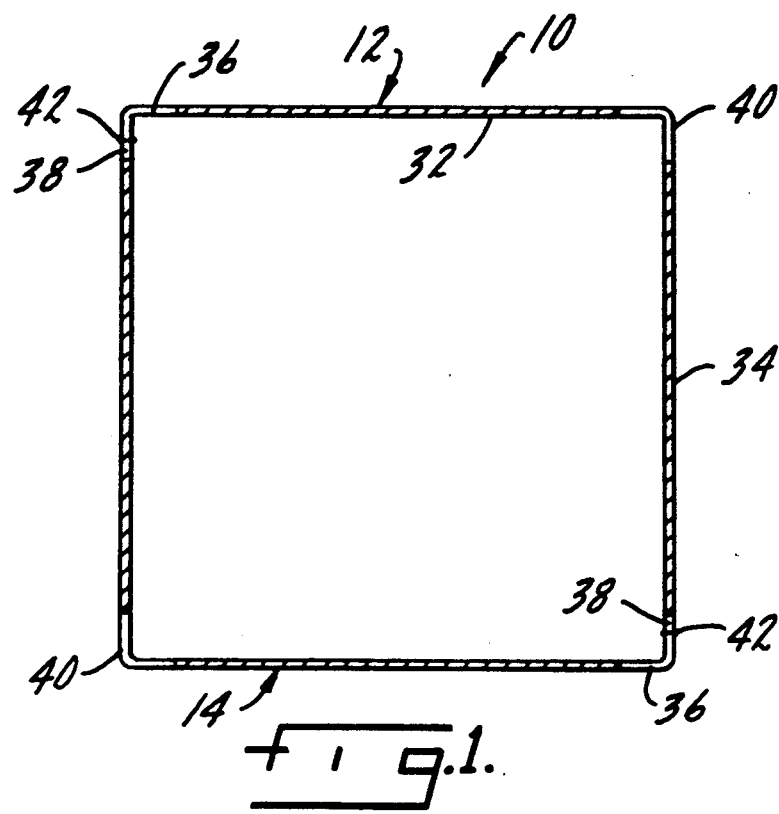
FIG. 1 illustrates the cross section of a neutron-absorbing tube according to the invention and made in accordance with the method of the invention.
Figure 2:
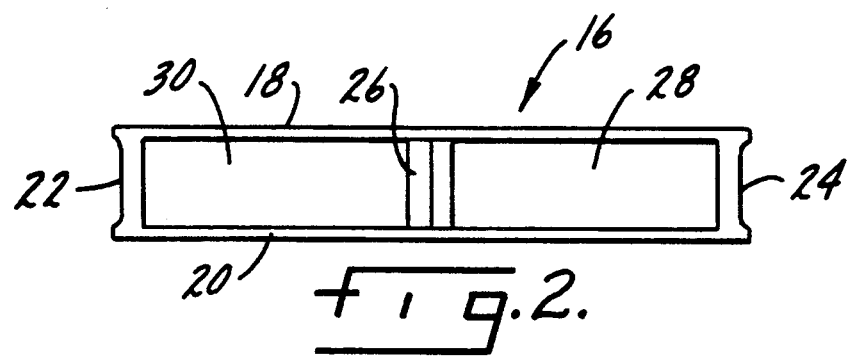
FIG. 2 illustrates, in an end view similar to a cross section, the formation of an elongate, generally rectangular metal ingot having a metal divider in the interior.
Figure 3:
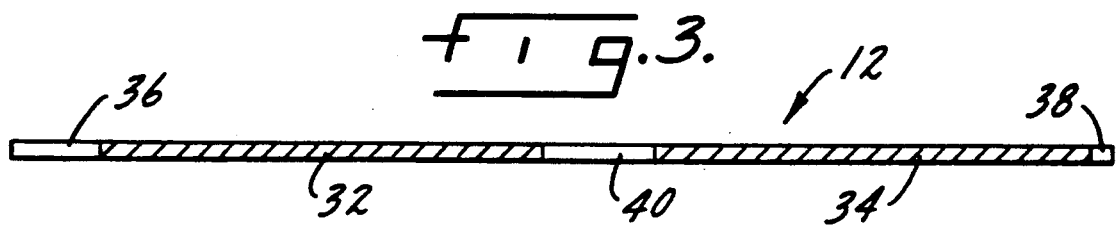
FIG. 3 illustrates the cross section of the ingot of FIG. 2 after the ingot has been soaked and hot rolled to reduce its thickness to form a thin, rigid neutron-absorbing sheet.

A neutron-absorbing tube according to the invention is shown generally at 10 in FIG. 1. Preferably, as will be described in greater detail immediately below, the tube 10 is formed of a pair of thin, rigid neutron-absorbing sheets 12 and 14 which are identical to one another, one of which is shown in FIG. 3, after rolling, trim and prior to bending. Each of the sheets 12 and 14 is formed from a metal ingot 16, as shown in FIG. 2.

The metal ingot 16 is formed in an elongate, generally rectangular fashion from aluminum, therefore having aluminum faces 18 and 20, and opposite aluminum side edges 22 and 24. The ingot can be formed in accordance with the disclosure of incorporated U.S. Pat. No. 4,027,377, or in accordance with any other process for formation of a similar ingot.

Once the ingot has been formed, at least one elongate, metal divider 26 is installed in the interior of the ingot to form the ingot into at least two chambers 28 and 30. The divider 26 shown in FIG. 2 is actually formed of one or more metal elements, and preferably is made of the same material as the metal ingot 16. Alternatively, the divider 26, side edges 22 and 24, and aluminum faces 18 and 20 can be formed as a single unit. Also, each metal divider 26 may, alternatively, be formed of a single length of metal, and as explained above, more than one metal divider may be installed in the hollow interior of the ingot 16, in order to form additional chambers. For example, if two metal dividers are installed, the dividers, in combination with the metal ingot, would form three chambers, three dividers would form four chambers, and so forth.

Once the ingot has been thus-formed, the chambers 28 and 30 are filled with a substantially uniformly dispersed mixture of a finely divided neutron-absorbing compound and a finely divided metal powder. The mixture preferably is in accordance with that disclosed in detail in incorporated U.S. Pat. No. 4,027,377. Other similar materials, however, may be formed as well so long as they exhibit the neutron-absorbing capacity after a sheet has been formed.

Once the ingot has been formed and filled, it is soaked to an elevated temperature which is below the melting temperature of the metal powder. In accordance with the preferred form of the invention, the ingot 16 is soaked for a period of time sufficient to raise the temperature of the ingot to between 800° and 850° Fahrenheit throughout, for rolling.

In the rolling operation, the ingot 16 is hot rolled to reduce its thickness. The thickness is preferably reduced in a series of passes through a rolling mill. During that process, the mixture of boron compound and metal powder become metallurgically bonded together or sintered to form the sheets 12 and 14. The resulting sheet has thin, rigid neutron-absorbing areas 32 and 34, opposite metal edge portions 36 and 38, and an elongated metal spacer portion 40 at the location of each metal divider 26 in the ingot 16. The edge portions of the sheet 12 are trimmed as necessary so that preferably the combined widths of the edge portions 36 and 38 approximates the width of each spacer portion 40, although the combined widths can be wider or narrower, as well.

After the sheet 12 has been formed, it is longitudinally bent at each spacer portion 40, preferably to an L-shaped cross section, as illustrated for each of the sheets 12 and 14 forming the tube 10 of FIG. 1. At the same time, the wider edge portion 36 is also bent to an L-shaped cross section. The two sheets 12 and 14 are then longitudinally joined at their edge portions 36 and 38 by welding, as shown at welds 42 in FIG. 1. It is preferred that the welds 42 not be located at the bends of the edge portions 36, but rather be formed on an unbent portion of the edge portion 36 to assure the greatest possible strength for the formed tube 10. Alternatively, if the edge portion 36 is not bent, the edge portions 36 and 38 can be abutted and welded where they abut.

The tube 10 is therefore formed with neutron-absorbing areas 32 and 34 of the sheets 12 and 14 being unbent, but with bends in the spacer portions 40 and edge portions 36 being wholly within solid metal areas. The bends therefore do not affect the integrity of the neutron-absorbing core portions or areas of the sheet.

Although the tube 10 is preferably formed of two sheets 12 and 14 formed and welded in accordance with the process set forth above, the tube 10 can also be formed from a single sheet having three metal dividers 26 installed in a metal ingot 16 forming four chambers in the ingot. After the ingot is filled and soaked, it is hot rolled in the same manner as described above, resulting in a sheet having opposite edge portions 36 and 38 similar to the sheet 12, but having three of the metal spacer portions 40 dividing adjacent neutron-absorbing areas. The thus-formed sheet is bent at each of the spacer portions to an L-shaped configuration, and also the edge portion 36 is bent to an L-shaped configuration, forming a tube appearing the same in cross section as the tube illustrated in FIG. 1. Since the tube is formed from a single sheet, only one longitudinal weld 42 is required to weld the edge portions 36 and 38 together to complete the tube.

Although the tube 10 is shown in its preferred form as being generally square in cross section, the tube can be formed with a rectangular cross section. In addition, the tube can be formed with more than four sides, in a pentagonal, hexagonal or other configuration. However the tube is formed, it is important that the tube be formed with longitudinal bends being located wholly within a metal spacer portion dividing adjacent neutron-absorbing areas of the sheet or sheets forming the tube.

Each of the metal dividers 26 may be formed of a single length of metal, or may be formed of one or more lengths of metal. However the dividers are configured, the ultimately-formed sheet is as illustrated in FIG. 3, with one or more spacer portions 40 being formed of metal, so that the sheet 12 may be bent at the spacer portions.

It is also preferred that the sum of the widths of the edge portions 36 and 38 equal that of the spacer portion 40, so that when each of the sheets 12 and 14 is bent, the resulting formed tube 10 is essentially symmetrical. Again, however, that relationship is not critical, and the sum of the widths can be greater or less than the width of the spacer portion 40.

A square tube 10 is illustrated in the drawing figures, manufactured from two of the sheets 12 having a central spacer portion 40. If a rectangular tube is desired, it will be evident that the metal divider 26 can be offset in the ingot 16 toward one or the other of the side edges 22 or 24 so that one of the chambers 28 or 30 is larger in the other, resulting in a sheet 12 with the spacer portion 40 offset toward one or the other of the edge portions 36 or 38. It will be evident to one skilled in the art that other shapes can be effected as well by simple location of the ultimate spacer portion or portions 40 and bending of the sheet or sheets 12 thereat.

The width of the spacer portion 40 is formed to the minimum extent necessary so that the sheets 12 and 14 can be bent without bending or affecting the integrity of the neutron-absorbing areas 32 and 34. The width of the various spacer portions 40 will be evident to one skilled in the art, given the disclosure of the present application.

Various changes can be made to the invention without departing from the spirit thereof or scope of the following claims.

What is claims is:

1. The method of making a section of a neutron-absorbing tube, comprising the steps of
   a. forming an elongate, generally rectangular metal ingot having a hollow interior,
   b. installing at least one elongate metal divider in said interior to form at least two chambers in said interior, c. filling said chambers with a substantially uniformly dispersed mixture of a finely divided neutron-absorbing boron compound and a finely divided metal powder, d. soaking the ingot to bring it to an elevated temperature below the melting temperature of the metal powder, e. hot rolling the ingot to reduce its thickness to form a thin, rigid neutron-absorbing sheet having opposite metal edge portions and an elongated metal spacer portion at each metal divider, and f. longitudinally bending the sheet at each spacer portion.

2. A method according to claim 1 in which method step "b" includes installing one metal divider and method step "f" includes longitudinally bending the sheet to an L-shaped cross section.

3. A method according to claim 2 including the step of making a second substantially identical section and joining said sections at said metal edge portions to form a tube.

4. A method according to claim 2 in which method step "f" further includes bending one of said metal edge portions to an L-shaped cross section.

5. A method according to claim 4 including the step of making a second substantially identical section and joining said sections at said metal edge portions to form a tube.

6. A neutron-absorbing tube made in accordance with the method of claim 1 in which the tube comprises a pair of sections each of which is bent to an L-shaped cross section at the metal spacer portion, said sections being welded at their edge portions to form a hollow tube.

7. The method of making a neutron-absorbing tube, comprising the steps of a. forming a pair of elongate, generally rectangular metal ingots having a hollow interior, b. installing an elongate metal divider in the hollow interior of each ingot to form two chambers in the interior of each ingot, c. filling said chambers with a substantially uniformly dispersed mixture of a finely divided neutron-absorbing boron compound and a finely divided metal powder, d. soaking each ingot to bring it to an elevated temperature below the melting temperature of the metal powder, e. hot rolling each ingot to reduce its thickness to form a thin, rigid neutron-absorbing sheet having opposite metal edge portions and an elongated metal spacer portion at each metal divider, f. longitudinally bending each sheet at the spacer portion to an L-shaped cross section, and g. joining the bent sheets at said metal edge portions to form a tube.

8. A method according to claim 7 in which method step "f" includes the step of bending one of the metal edge portions of each sheet to an L-shaped cross section.

9. A method according to claim 8 in which method step "g" includes joining the bent edge portion of each sheet to the other edge portion of the other sheet.

10. A method according to claim 9 in which joining is by welding.

11. A method according to claim 9 in which method step "e" includes forming each sheet to have one metal edge portion of greater width than the other edge portion.

12. A method according to claim 11 in which method step "f" includes the step of bending the one metal edge portion of each sheet to an L-shaped cross section.

13. A method according to claim 12 in which method step "g" includes joining the bent edge portion of each sheet to the other edge portion of the other sheet.

14. A neutron-absorbing tube made in accordance with the method of claim 7 in which the tube comprises a pair of sheets each of which is bent to an L-shaped cross section at the metal spacer portion, said sheets being welded at their edge portions to form a hollow tube.

15. The method of making a neutron-absorbing tube, comprising the steps of a. forming an elongate, generally rectangular metal ingot having a hollow interior, b. installing a series of elongate metal dividers in said interior to form at least four chambers in said interior, c. filling said chambers with a substantially uniformly dispersed mixture of a finely divided neutron-absorbing boron compound and a finely divided metal powder, d. soaking the ingot to bring it to an elevated temperature below the melting temperature of the metal powder, e. hot rolling the ingot to reduce its thickness to form a thin, rigid neutron-absorbing sheet having opposite metal edge portions and an elongated metal spacer portion at each metal divider, f. longitudinally bending the sheet at each spacer portion, and g. joining said metal edge portions to form a tube.

16. A method according to claim 15 in which method step "b" includes installing four metal dividers and method step "f" includes longitudinally bending the sheet to an L-shaped cross section at each metal spacer portion.

17. A method according to claim 16 in which method step "f" further includes bending one of said metal edge portions to an L-shaped cross section.

18. A method according to claim 17 in which method step "e" includes the step of forming one metal edge portion of greater width than the other edge portion.

19. A method according to claim 18 in which method step "f" includes the step of bending the one metal edge portion to an L-shaped cross section.

20. A method according to claim 19 in which method step "g" includes joining the bent edge portion to the other edge portion by welding.

* * * * *